(12) United States Patent
Tsubota et al.

(10) Patent No.: US 8,362,389 B2
(45) Date of Patent: Jan. 29, 2013

(54) APPARATUS FOR IMPROVING RESIDUAL STRESS IN TUBULAR BODY AND ADJUSTMENT METHOD OF THE SAME

(75) Inventors: Shuho Tsubota, Takasago (JP); Takashi Ishide, Nagasaki (JP); Takashi Akaba, Kobe (JP); Hironori Onitsuka, Kobe (JP); Kenichi Kawanishi, Kobe (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 413 days.

(21) Appl. No.: 12/598,804

(22) PCT Filed: May 30, 2008

(86) PCT No.: PCT/JP2008/059971
§ 371 (c)(1),
(2), (4) Date: Jan. 6, 2010

(87) PCT Pub. No.: WO2008/146904
PCT Pub. Date: Dec. 4, 2008

(65) Prior Publication Data
US 2010/0122972 A1 May 20, 2010

(30) Foreign Application Priority Data
May 30, 2007 (JP) .................. 2007-142862

(51) Int. Cl.
*B23K 26/00* (2006.01)
*B23K 26/08* (2006.01)
*B23K 31/00* (2006.01)
*C21D 1/30* (2006.01)
*C21D 1/34* (2006.01)
*C21D 9/08* (2006.01)
*C21D 9/50* (2006.01)

(52) U.S. Cl. ......... 219/121.62; 219/121.77; 219/121.83; 148/565

(58) Field of Classification Search .......... 219/121.61, 219/121.62, 121.76, 121.78, 121.79, 121.82, 219/121.83, 121.85; 148/565, 909
See application file for complete search history.

(56) References Cited

U.S. PATENT DOCUMENTS
5,790,620 A * 8/1998 Okazaki et al. ............... 376/305
(Continued)

FOREIGN PATENT DOCUMENTS
JP  09-179003 A   7/1997
JP  2005-232586 A  9/2005
(Continued)

OTHER PUBLICATIONS
International Search Report of PCT/JP2008/059971. Mailing date of Jul. 8, 2008.
(Continued)

*Primary Examiner* — Samuel M Heinrich
(74) *Attorney, Agent, or Firm* — Westerman, Hattori, Daniels & Adrian, LLP

(57) ABSTRACT

Aims are to provide a tubular-body residual-stress improving apparatus and an adjustment method thereof capable of adjusting irradiation position with favorable reproducibility, even when an optical fiber is eccentric. In the tubular-body residual-stress improving apparatus, an optical control unit (5) includes a rotational hold mechanism (9) for holding an optical fiber (6) in a manner that the optical fiber (6) is rotatable in a circumferential direction of the optical fiber (6), and, if a position of an intensity peak of the laser beam from the optical fiber (6) in an axial direction of the tubular body (2) is offset from the center of an irradiation profile, a position at which the optical fiber (6) is held in the circumferential direction is adjusted by the rotational hold mechanism (9) so as to eliminate the offset or to minimize an influence of the offset.

3 Claims, 3 Drawing Sheets

U.S. PATENT DOCUMENTS

| | | | |
|---|---|---|---|
| 7,485,828 B2 * | 2/2009 | Akaba et al. ............... | 219/121.8 |
| 8,044,323 B2 * | 10/2011 | Akaba et al. ............. | 219/121.78 |
| 2007/0175873 A1 | 8/2007 | Akaba et al. | |
| 2007/0181541 A1 | 8/2007 | Akaba et al. | |

FOREIGN PATENT DOCUMENTS

| | | |
|---|---|---|
| JP | 2006-015399 A | 1/2006 |
| JP | 2006-035292 A | 2/2006 |
| JP | 2006-037199 A | 2/2006 |
| JP | 2006-309574 A | 11/2006 |
| JP | 2007-118058 A | 5/2007 |

OTHER PUBLICATIONS

Japanese Office Action dated Oct. 16, 2012, issued in corresponding Japanese Patent Application No. 2007-142862, with English translation (4 pages).

* cited by examiner

APPARATUS FOR IMPROVING RESIDUAL STRESS IN TUBULAR BODY AND ADJUSTMENT METHOD OF THE SAME

TECHNICAL FIELD

The present invention relates to a tubular-body residual-stress improving apparatus for improving a residual stress in a tubular body such as a pipe, and to an adjustment method of the apparatus.

BACKGROUND ART

Installation of a tubular body, such as a large pipe, in such facilities as nuclear power plants and large-scale plants has a problem of removing a stress remaining in the pipe after welding. Welding causes a residual stress in a pipe, and the residual stress may possibly shorten the life of the pipe. For this reason, it is desirable that such residual stress caused by welding be removed.

The inventors of the present application have proposed a method for improving the residual stress that remains in a pipe. The outer circumferential surface of a pipe is irradiated with laser light emitted from a laser that is moving around the pipe. The pipe is thus rapidly heated up to a temperature that will not negatively affect the material of the pipe. The heating causes a temperature difference between the inner surface and the outer surface of the pipe, and thus contributes to the reduction in the residual stress in the pipe (see patent Documents 1 to 4).

Patent Document 1: JP-A-2006-035292
Patent Document 2: JP-A-2006-015399
Patent Document 3: JP-A-2006-037199
Patent Document 4: JP-A-2005-232586

DISCLOSURE OF THE INVENTION

Problem to be Solved by the Invention

According to these tubular-body residual-stress improving apparatuses disclosed in patent Documents 1 to 4, an outer-circumferential surface of a pipe is heated up to a desired temperature. It is thus preferable that the irradiation length in the axial direction and the irradiation width in the circumferential direction be controlled within their respective appropriate ranges that correspond to the curvature of the pipe. For example, such a residual-stress improving apparatus controls laser beams in the following way. The apparatus uses optical fibers to transmit laser beams emitted from a laser light source. Then, the apparatus uses a heating optical system to enlarge the laser beams thus transmitted so as to obtain a desired irradiation length in the axial direction and a desired irradiation width in the circumferential direction. An optical fiber, however, has a concentricity tolerance, which brings about the following problem. When a laser beam transmitted through an optical fiber is enlarged before an irradiation-target pipe is irradiated with the laser beam, an eccentricity of the optical fiber in the order of several tens to several hundred of micrometers may result in a large position offset in the order of ten millimeters, depending on the enlargement ratio. Further, such a position offset makes it difficult to carry out favorably-reproducible adjustment of the irradiation position when, for example, the optical fiber is replaced with another one.

The present invention has been made in view of the above-described problem and aims to provide a tubular-body residual-stress improving apparatus whose irradiation position can be adjusted with favorable reproducibility, even when an optical fiber is eccentric. The invention also aims to provide an adjustment method of the apparatus.

Means for Solving the Problems

A first aspect of the invention for solving the above-described problem provides a tubular-body residual-stress improving apparatus comprising:
rotationally driving means for moving around an outer circumference of a cylindrical tubular body;
at least one optical fiber for transmitting therethrough a laser beam from a laser light source; and
an optical control unit held by the rotationally driving means and optically connected to each optical fiber, the optical control unit adjusting an area irradiated with the laser beam from the optical fiber,
the tubular-body residual-stress improving apparatus improving a residual stress of the tubular body by irradiating an outer circumferential surface of a welded portion of the tubular body with the laser beam emitted from the optical control unit, while moving, in a circumferential direction of the tubular body, the area irradiated with the laser beam, wherein
the optical control unit includes a rotational hold mechanism for holding the optical fiber in a manner that the optical fiber is rotatable in a circumferential direction of the optical fiber, and
if a position of an intensity peak of the laser beam from the optical fiber in an axial direction of the tubular body is offset from the center of an irradiation profile, a position at which the optical fiber is held in the circumferential direction is adjusted by the rotational hold mechanism so as to eliminate the offset or to minimize an influence of the offset.

A second aspect of the invention for solving the above-described problem provides an adjustment method for a tubular-body residual-stress improving apparatus, the tubular-body residual-stress improving apparatus including:
rotationally driving means for moving circling around an outer circumference of a cylindrical tubular body;
at least one optical fiber for transmitting therethrough a laser beam from a laser light source; and
an optical control unit held by the rotationally driving means and optically connected to each optical fiber, the optical control unit adjusting an area irradiated with the laser beam from the optical fiber, the tubular-body residual-stress improving apparatus improving a residual stress of the tubular body by irradiating an outer circumferential surface of a welded portion of the tubular body with the laser beam emitted from the optical control unit, while moving, in a circumferential direction of the tubular body, the area irradiated with the laser beam, the adjustment method comprising:
adjusting, if a position of an intensity peak of the laser beam from the optical fiber in an axial direction of the tubular body is offset from the center of an irradiation profile, a position at which the optical fiber is held in the circumferential direction so as to eliminate the offset or to minimize an influence of the offset, performed by means of a rotational the adjustment being hold mechanism, the rotational hold mechanism being attached to the optical control unit, and holding the optical fiber in a manner that the optical fiber is rotatable in a circumferential direction of the optical fiber.

A third aspect of the invention for solving the above-described problem provides the adjustment method for a tubular-body residual-stress improving apparatus according to the second aspect of the invention, wherein the position at which the optical fiber is held in the circumferential direction is adjusted by using a far-field pattern of the laser beam from the optical fiber.

Effects of the Invention

According to the present invention, the rotational hold mechanism rotatably holds an optical fiber. Even if the optical fiber has eccentricity, the rotational hold mechanism can correct, or minimize the amount of the offsetting of the irradiation position of the laser beam. Accordingly, the reproducing of the same treatment results can be achieved more easily than in the case where the optical fiber employed in the apparatus is changed and in the case where the rotation of the optical fiber is set arbitrarily. In addition, the irradiation area that needs input of heat can be irradiated with the laser beam while the irradiation of unnecessary area with the laser beam is reduced. Accordingly, the wasting of the laser-beam output can be reduced. Consequently, leakage of light can be reduced. The reduction in the leakage of light helps to prevent the apparatus from being damaged and to prevent a disaster from being caused.

BRIEF DESCRIPTION OF THE DRAWINGS

FIG. 2(a) is its perspective view while FIG. 2(b) is its side-elevation view.

EXPLANATION OF REFERENCE NUMERAL

Figure 1:
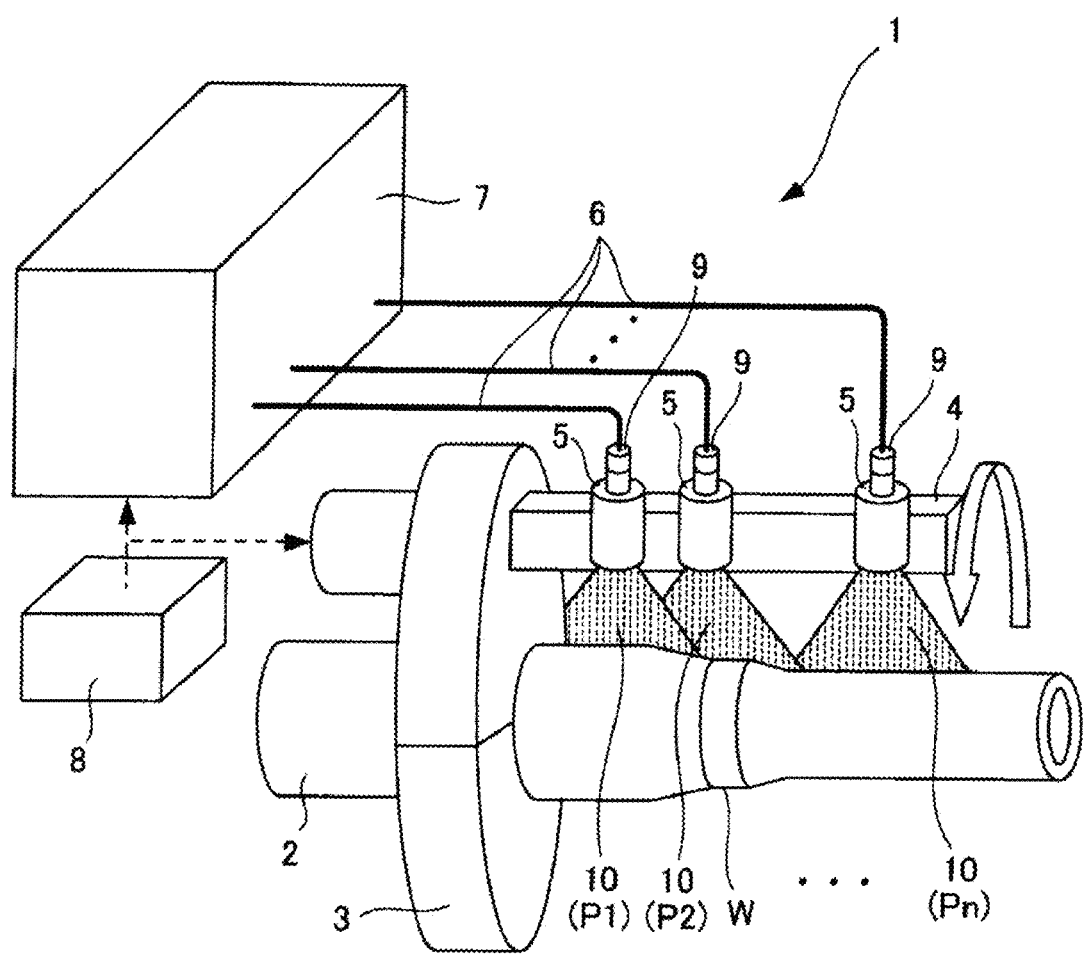
FIG. 1 is a schematic diagram illustrating the configuration of a tubular-body residual-stress improving apparatus according to an embodiment of the present invention.

1: residual-stress improving apparatus
2: pipe
3: rotationally driving apparatus
4: arm portion
5: optical control unit
6: optical fiber
7: laser oscillator
8: control unit
9: rotational hold mechanism
9a: fixed support portion
9b: rotatable hold portion
10: laser beam
12, 14: lenses
13: mirror

BEST MODES FOR CARRYING OUT THE INVENTION

With reference to FIGS. 1 to 3, detailed descriptions will be given as to a tubular-body residual-stress improving apparatus according to the present invention.

Embodiment 1

FIG. 1 is a schematic diagram illustrating a configuration of a tubular-body residual-stress improving apparatus according to the present invention.

FIG. 1 shows that a residual-stress improving apparatus 1 includes a rotationally driving apparatus 3 (rotationally driving means), an arm portion 4, plural laser heads 5 (optical control units), plural optical fibers 6, and a control unit 8. The rotationally driving apparatus 3 is disposed so as to be capable of moving around the outer circumference of a pipe 2, which is a cylindrical tubular body. The rotationally driving apparatus 3 moves at a controllable moving speed in the circumferential direction of the pipe 2. The arm portion 4 is supported by the rotationally driving apparatus 3, extends along the axial direction of the pipe 2, and is capable of moving concentrically with and around the pipe 2. The plural laser heads 5 are held by arm portion 4, and irradiate a predetermined area of the outer-circumferential surface of a welded portion W of the pipe 2 with laser beams 10. The plural optical fibers 6 transmit laser beams from a laser oscillator 7 (laser light source) to the plural laser heads 5. The control unit 8 controls the rotationally driving apparatus 3, the laser oscillator 7, and the like. Moreover, the laser heads 5 are respectively provided with rotational hold mechanisms 9. Each of the rotational hold mechanisms 9 holds the optical fiber 6 in such a manner that the optical fiber 6 can rotate in the circumferential direction thereof. Each laser head 5 and the corresponding optical fiber 6 are optically connected to each other through the rotational hold mechanism 9.

The rotationally driving apparatus 3 is detachably attached to the outer circumference of the pipe 2. The rotationally driving apparatus 3 can be placed freely at any position where the residual stress needs to be improved such for example as at a position located around a welded portion W. Note that the rotationally driving apparatus 3 may have any configuration as long as the rotationally driving apparatus 3 holds the pipe 2 on its inner-circumference side and has a rotatable outer-circumference side where the arm portion 4 is supported. For example, a possible configuration may have a fixed portion located on its inner-circumference side and a circling portion on its outer-circumference side. The fixing portion holds the pipe 2. The circling portion supports the arm portion 4 and circles concentrically with and around the pipe 2.

The laser heads 5, the optical fibers 6, and the laser oscillator 7 together form a heating optical system. The plural laser heads 5 disposed on the arm portion 4 along the axial direction of the pipe 2 irradiate a predetermined area of the outer-circumferential surface of the pipe 2 with the plural laser beams 10 so that the predetermined area can be heated uniformly. The laser heads 5 adjust the positions of their components such as the lenses and mirrors so as to adjust the irradiation width in the circumferential direction and the irradiation length in the axial direction, thereby obtaining a desired heating area. A detail description of this adjustment will be given later. Here, as an example, the number of the optical fibers 6 is n and the pipe 2 is irradiated with the plural laser beams 10, which are denoted respectively by P1 to Pn (n is an integer equal to or more than two) and correspond respectively to the optical fibers 6. The number of the optical fibers 6, that of the laser heads 4, and that of the laser beams 10 can be changed appropriately depending on the irradiation conditions. What is necessary is providing at least one optical fiber 6 and at least one laser head 5, which are used to emit at least one laser beam.

A residual stress can be improved by the residual-stress improving apparatus 1 according to the present invention in the following way. Firstly, the heating area is adjusted in advance by adjusting the laser heads 5. Then, the control unit 8 controls the output of the laser oscillator 7, and also causes the rotationally driving apparatus 3 to move around while controlling the moving speed thereof at a predetermined moving speed. Moving around the outer circumference of the pipe 2, the laser heads 5 irradiates a predetermined area of the outer-circumferential surface of the pipe 2 with the laser beams 10. Thus, the predetermined area of the outer-circumferential surface of the pipe 2 is heated. By using a temperature difference between the inner surface and the outer surface of the pipe 2 that is caused by this heating, the inner surface of pipe 2 is brought into a tensile-yield state. As a consequence, when the pipe 2 is cooled down, the residual stress in the inner surface thereof is reduced or improved so as to be turned to a compressive stress. The laser heads 5 may circle once or alternatively plural times. If the laser heads 5 circle plural times, the moving around may be finished at a position that is different from the starting position. In addition, the heating temperature is preferably set at a temperature that will not negatively affect the material of the pipe 2. Moreover, forcible cooling of the inner-surface side of the pipe 2 is not an essential part of the present invention.

First of all, a brief description will be given as to the principle of the residual-stress improvement by use of the tubular-body residual-stress improving apparatus of the present invention.

When the residual stress of a predetermined area in the vicinity of the welded portion W of the pipe 2 is improved according to the present invention, the outer-circumferential surface of the pipe 2 is heated with the laser beams so as to cause a predetermined temperature difference between the outer surface and the inner surface of the pipe 2. Performing this heating turns the outer surface to a state of a compressive stress, and turns the inner surface to a state of a tensile stress and further to a state of tensile yield. Once the heating has been finished, the temperature difference between the inner surface and the outer surface of the predetermined area disappears, and the temperature of these surfaces is lowered down approximately to the room temperature. Then, the outer surface is turned to a state of a tensile stress, and the inner surface is turned to a state of a compressive stress. The yield stress allows the residual stress of the inner surface to be improved from the tensile-stress state to the compressive-stress state. The conditions under which the laser heating is performed is preferably set so that the magnitude of the stress (amount of strain) to be produced at the time of heating is at least equal to or larger than the amount of strain equivalent to the yield stress. In this way, the residual stress generated in the inner surface of the pipe 2 can be improved from the tensile state to the compressive state. As a consequence, stress corrosion cracking can be prevented from occurring in the inner surface of the tubular body.

In order to obtain a desired amount of strain by heating, with laser, the outer-circumferential surface of the pipe 2 (the vicinity of the welded portion W), it is necessary to control the irradiation length in the axial direction and the irradiation width in the circumferential direction within their respective proper ranges. Each of the irradiation length in the axial direction and the irradiation width in the circumferential direction varies depending upon such factors as the shape of the pipe 2 (specifically, the diameter and the wall thickness of the pipe 2), the material of the pipe 2, and the installation environment of the pipe 2. Accordingly, it is necessary to appropriately set the irradiation length in the axial direction and the irradiation width in the circumferential direction based on such conditions.

The use of the optical fibers 6 to supply laser beams to their respective laser heads 5 makes the irradiation area narrower than otherwise. So, expanding the irradiation area by means of, for example, a lens or a concave mirror is needed to obtain a desired irradiation length in the axial direction and a desired irradiation width in the circumferential direction. Each optical fiber 6, however, has concentricity tolerance, which brings about a problem when the laser beams transmitted through their respective optical fibers 6 are enlarged before a target pipe is irradiated with the laser beams thus enlarged. That is, depending on the enlargement ratio of a lens or the like, an eccentricity of each optical fiber 6 in the order of several tens to several hundred of micrometers may result in a large position offset in the order of ten millimeters. Such an eccentricity does not matter when the optical fiber is used for communication purposes. The eccentricity, however, does matter a great deal when, as in the case of the present invention, the optical fiber is used to transmit a laser beam for heating and when both the heating area and the formation temperature need to be controlled accurately.

The position offset as above makes it therefore impossible to obtain a desired irradiation length in the axial direction and a desired irradiation width in the circumferential direction. The irradiation width in the circumferential direction has a relatively large tolerable range. This is because what affects the temperature distribution is the accumulation of, along the circumferential direction, heat input at each position in the axial direction of the pipe 2. Thus, a minor offset of the irradiation width in the circumferential direction does not cause a large fluctuation in the temperature distribution. In contrast, even a slightest offset of the irradiation length in the axial direction does cause a large fluctuation in the temperature distribution. This is because the irradiation length in the axial direction has a direct influence on the temperature distribution. Specifically, according to the present invention, the plural laser heads 5 are arranged in a straight line along the axial direction of the pipe 2. Further, the laser beams 10 which are emitted from the plural laser heads 5 and which the pipe 2 is irradiated with are designed to form a substantially straight line. Thus, when two of the laser beams 10 emitted respectively from two adjacent ones of the laser heads 5 are offset in the axial direction of the pipe 2, the irradiation amount may possibly become excessively large in a portion at which the two adjacent laser beams 10 overlap each other. Alternatively, there may be no portion at which the laser beams 10 overlap each other, which results in a formation of an area that receives no laser-beam irradiation.

An excessively large irradiation amount results in excessive heating, and may possibly harm the material itself of the pipe 2. In contrast, the formation of no-irradiation area results in insufficient heating, which in turn results in an insufficient improvement in the residual stress. With this insufficient improvement in the residual stress, the SCC (stress corrosion cracking) may not be prevented reliably.

Such position offset sometimes causes irradiation of an unnecessary area with laser beams. In such case, extra output of laser beams is need, which results in a waste of the laser-beam output. In addition, the position offset may possibly turn a part of laser beams to be a leakage of light, which may possibly harm the apparatus or cause a disaster.

In this respect, in order to address the above-described problem, the tubular-body residual-stress improving apparatus according to the present invention uses the rotational hold mechanisms 9 as a mechanism to hold the optical fibers 6 on the laser heads 5. Each rotational hold mechanism 9 holds the optical fiber 6 in such a manner that the optical fiber 6 can rotate in its circumferential direction.

Figure 2A:
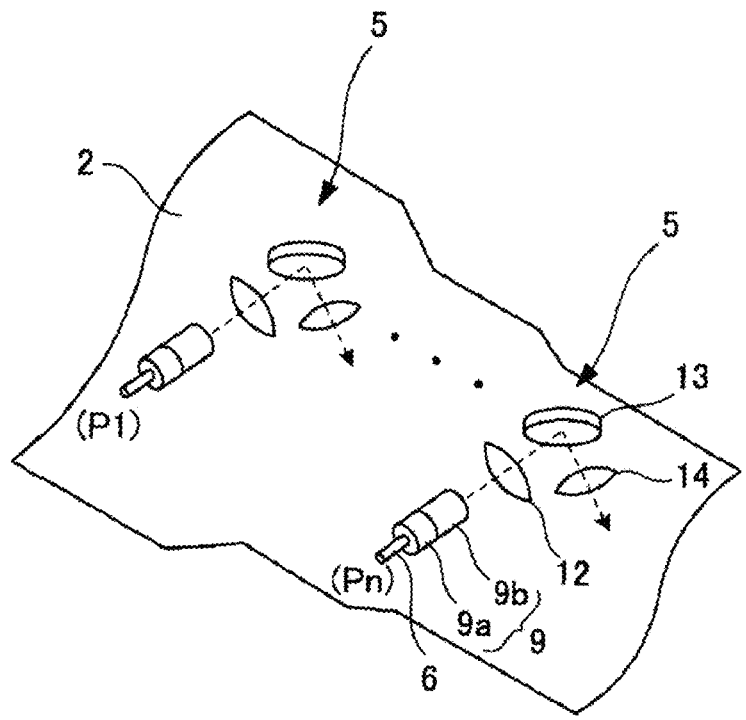
FIGS. 2(a) and 2(b) are schematic diagrams each illustrating the configuration of an optical control unit of the tubular-body residual-stress improving apparatus according to the embodiment.
Figure 2B:
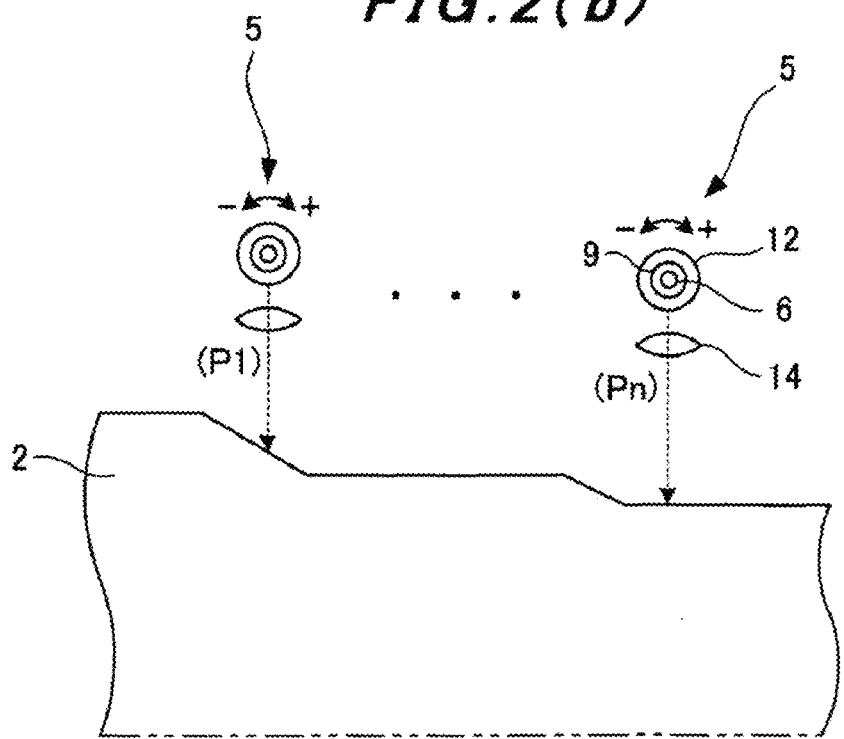

FIGS. 2(a) and 2(b) are schematic diagrams each illustrating the configuration of the laser head 5 according to this embodiment. A description of the configuration will be given below by referring to FIGS. 2(a) and 2(b). Note that no casing for each laser head 6 is illustrated in FIG. 2(a) or in FIG. 2(b)

in order to show the inside of the optical system. In addition, to make the drawings more understandable, only the optical systems for the laser beams P1 and Pn of the plural laser beams are illustrated in FIGS. 2(a) and 2(b). Moreover, though each of the optical paths for the laser beams P1 and Pn is actually expanded and reflected by use of lenses, mirrors and the like, FIGS. 2(a) and 2(b) show only principal optical paths.

As FIGS. 2(a) and 2(b) show, the laser heads 5 of this embodiment respectively adjust the optical paths for the laser beams P1 to Pn. The optical systems provided respectively on the optical paths are identical to one another. The optical system, for example, for the laser beam Pn includes a lens 12, a mirror 13, and a lens 14, which are arranged in this order along the direction in which the laser beam Pn advances. The laser beam P1 emitted from the optical fiber 6 enters the lens 12 that enlarges the laser beam. The laser beam thus enlarged by the lens 12 is reflected by the mirror 13 towards the pipe 2. The laser beam thus reflected by the mirror 13 is further enlarged by the lens 14. Then, a desired area of the pipe 2 is irradiated with the laser beam thus enlarged by the lens 14. In addition, protective glasses may be respectively provided at the earliest stage and at the latest stage of each of the optical systems for the purpose of protecting the optical system.

Suppose a case where, in the optical system, the optical fiber 5 held on the laser head 5 has no eccentricity (fine concentricity). In this case, as FIG. 3(a) to be described later shows, substantially identical intensity peaks and substantially identical profiles are obtained for all the cases in each of which the optical fiber is held at any angular position in the circumferential direction. Now, suppose a contrasting case where the optical fiber 6 has an eccentricity (poor concentricity). In this case, as FIG. 3(b) to be described later shows, shifts in the intensity peak and in the profile occur depending upon the circumferential-direction position at which the optical fiber 6 is held. This is because poor concentricity causes the expanding angle of the laser beam 10 to fluctuate depending upon the circumferential direction of the holding. Zero concentricity for each of all the optical fibers is ideal, but a tolerance due to, for example, the manufacturing error is inevitable.

To solve this problem, in this embodiment, the hold mechanism to hold the optical fiber 6 on the laser head 5 is provided with a rotating mechanism, thus functioning as the rotational hold mechanism 9. The rotational hold mechanism 9 is used to rotate the corresponding optical fiber 6 in the circumferential direction thereof. The circumferential-direction rotation of the optical fiber 6 allows the laser beam 10 to be adjusted in such away that shifted intensity peak and profile thereof can be moved respectively to the intensity peak and profile of a case without any eccentricity.

With the above-described configuration, even if the optical fiber 6 has an eccentricity, the fluctuations, caused by the eccentricity of the optical fiber 6, in the position of the intensity peak of the laser beam 10 and in the position of the profile thereof can be corrected using the rotational hold mechanism 9. Accordingly, necessary irradiation area in the axial direction of the pipe 2 can be irradiated with the laser beams with a favorable reproducibility. In addition, irradiation of an unnecessary area with laser beams can be reduced. Thus, the wasting of the laser-beam output can be reduced and so can the leakage of light, which in turn prevents the damaging of the apparatus and the occurrence of a disaster.

Even when the optical fiber 6 that has been removed is reassembled or the optical fiber 6 is replaced with another optical fiber, the eccentricity that is unique to each optical fiber can be corrected, or the influence of the eccentricity can be minimized.

Note that the rotational hold mechanism 9 may have any configuration as long as the optical fiber 6 can be rotatably held by the rotational hold mechanism 9. For example, the rotational hold mechanism 9 of this embodiment includes a rotational hold portion 9a and a fixed support portion 9b. The rotational hold unit 9a rotatably holds the optical fiber 6. The fixed support portion 9b is fixed to the casing of the laser head 5 and rotatably supports the rotational hold portion 9a. It is desirable for the rotational hold mechanism 9 to have a structure that provides a range allowing a 360° rotation thereof. If the fixed support portion 9b is capable of rotating by 180° before it is fixed to the casing, the rotatable hold portion 9a should have at least a 180° rotatable range. The rotational hold portion 9a does not have to have an unlimited rotatable range as long as a 360° rotational adjustment is achieved by means of the rotatable angle of the rotational hold portion 9a combined with the angle at the time of fixing the fixed support portion 9b. In addition, the rotatable angle may be changed either continuously or in a step-like manner (for example, at 15° intervals).

Embodiment 2

Figure 3A:
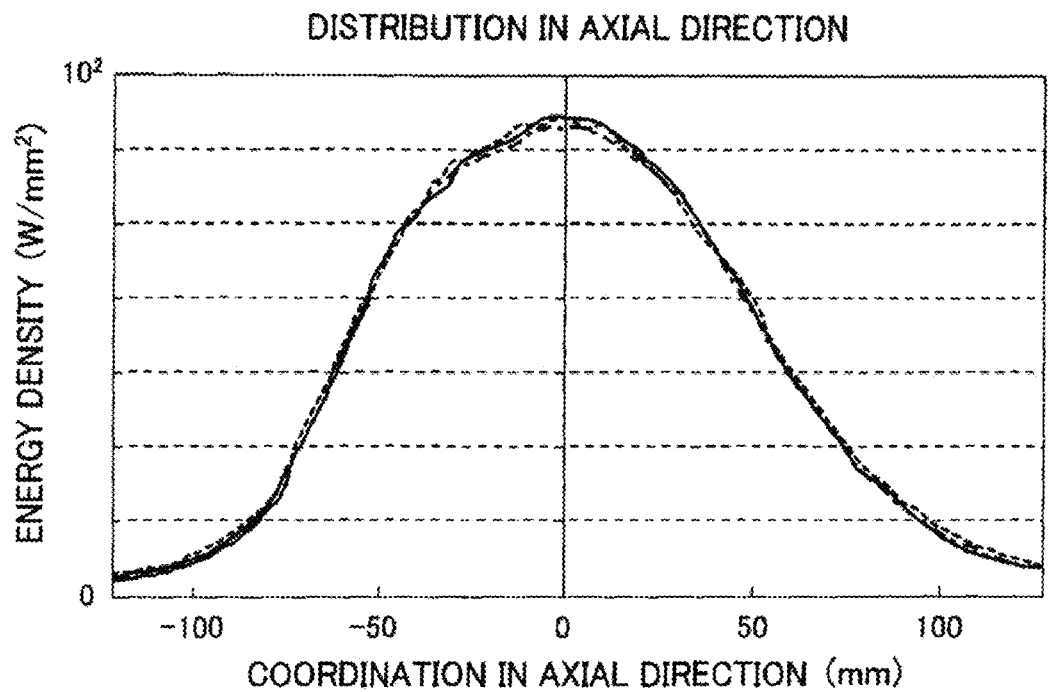
FIG. 3(a) is a graph illustrating an input-heat profile in a case where the position at which an optical fiber without any eccentricity is held is changed in a circumferential direction of the optical fiber.
Figure 3B:
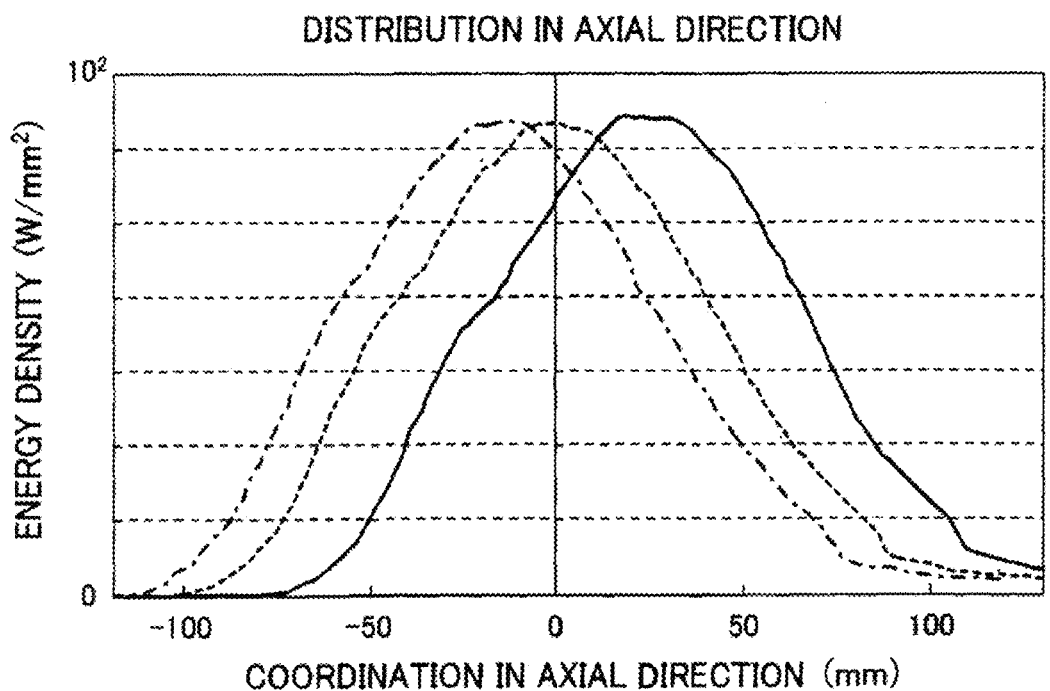
FIG. 3(b) is a graph illustrating an input-heat profile in a case where the position at which an optical fiber with eccentricity is held is changed in the circumferential direction of the optical fiber.

With reference to FIGS. 3(a) and 3(b), a description will be given of an adjustment method of the residual-stress improving apparatus 1 described in Embodiment 1. Specifically, an adjustment method of the rotational hold mechanism 9 will be described. Note that FIGS. 3(a) and 3(b) are graphs showing heat-input profiles obtained by changing the circumferential-direction positions at which an optical fiber with eccentricity and an optical fiber without any eccentricity are held, respectively.

As shown in FIG. 3(a), without any eccentricity of the optical fiber 6, a change in the circumferential-direction position at which the optical fiber 6 is held hardly causes a change in its heat-input profile irradiation profile). In contrast, with eccentricity of the optical fiber 6, a change in the circumferential-direction position at which the optical fiber 6 is held causes a shift of its heat-input profile. This may possibly make the laser beam miss the necessary irradiation position in the axial direction of the pipe 2.

To solve this, the present invention employs the rotational hold mechanism 9, such as one shown in Embodiment 1. The rotational hold mechanism 9 makes the optical fiber 6 rotate in its circumferential direction, and thus makes the heat-input profile shift in the axial direction of the pipe 2. In this way, the heat-input profile can be moved to the necessary irradiation position in the axial direction of the pipe 2.

The adjustment method of the rotational hold mechanism 9 may be carried out in the following ways, for example.

(1) The irradiation profiles of the laser beams are measured, and then the rotational hold mechanisms 9 of the respective laser heads 5 are adjusted one by one by referring to the measurement results.

(2) The irradiation profiles of the laser beams are measured, and the measurement results are treated numerically. Subsequently, the rotational hold mechanisms 9 of the respective laser heads 5 are adjusted one by one so that the intensity-peak position for each laser beam can be located at the center of the irradiation profile. Thus, the rotational angles are determined.

(3) The irradiation profiles of the laser beams are measured. Then, the light-source characteristics are determined by performing an inverse operation on the light-source characteristics through an optical analysis, on the basis of the measurement results. Subsequently, another optical analysis is carried out using the light-source characteristics thus determined, and thus irradiation profiles of the pipe 2 with the laser beams are calculated. Then, the rotational hold mechanisms 9 of the respective laser heads 9 are adjusted one by one so as to minimize the offset in the intensity-peak position for each laser beam from the center of the corresponding irradiation profile. Thus the rotational angles are determined.

(4) Reference peak positions or reference profiles are determined in advance. Then, the rotational angle for each rotational hold mechanism 9 is determined so that either the corresponding reference peak position or the corresponding reference profile can be obtained. At the determination of this rotational angle, the far-field pattern of each laser beam 10 is measured, and then the rotational angle of the rotational hold mechanism 9 is determined on the basis of the measurement result. This allows an accurate and easy adjustment. The reason is that a larger beam diameter is obtainable by the use of the far-field pattern of each laser beam 10, so that the profile of the laser beam, in particular, the peak position becomes more noticeable.

INDUSTRIAL APPLICABILITY

The present invention is suitable for improvement in a residual stress in a cylindrical pipe.

The invention claimed is:

1. A residual-stress improving apparatus for a tubular-body, comprising:
    at least one optical fiber for transmitting therethrough at least one laser beam from a laser light source;
    driving means for moving said laser beam around said outer circumference of said tubular-body and about a tubular axis of said tubular-body; and
    an optical control unit held by said driving means and optically connected to each said optical fiber,
    wherein said optical control unit includes a hold mechanism for holding said optical fiber, such that said optical fiber is rotatable in a circumferential direction about a tubular axis of said optical fiber,
    wherein said laser beam irradiates said outer circumferential surface of said tubular body when held by said optical control unit,
    wherein said optical control unit adjusts an area on said tubular-body irradiated with said laser beam,
    wherein said laser beam moves along with said driving means to improve residual stress by irradiating on a circumferential surface of a welded portion of said tubular-body.

2. An adjustment method for a residual-stress improving apparatus for a tubular-body, said residual-stress improving apparatus comprising:
    at least one optical fiber for transmitting therethrough at least one laser beam from a laser light source;
    driving means for moving said laser beam around said outer circumference of said tubular-body and about a tubular axis of said tubular-body; and
    an optical control unit held by said driving means and optically connected to each said optical fiber,
    wherein said optical control unit includes a hold mechanism for holding said optical fiber, such that said optical fiber is rotatable in a circumferential direction about a tubular axis of said optical fiber,
    wherein said laser beam irradiates said outer circumferential surface of said tubular body when held by said optical control unit,
    wherein said optical control unit adjusts an area on said tubular-body irradiated with said laser beam,
    wherein said laser beam moves along with said driving means to improve residual stress by irradiating on a circumferential surface of a welded portion of said tubular-body, said adjustment method comprising:
    determining an intensity peak of said laser beam offsets from a center of said laser beam's irradiation profile in an axial direction of said tubular body; and
    adjusting said optical fiber's position by rotating said optical fiber to reduce said offset.

3. The adjustment method for a residual-stress improving apparatus for a tubular-body according to claim 2, wherein a position said optical fiber in a circumferential direction is adjusted by using a far-field pattern of the laser beam from the optical fiber.

* * * * *